Sept. 29, 1964     L. BRADT     3,150,609
TRAIN AND AUTOMATIC SEPARATION MEANS FOR VEHICLES THEREOF
Filed June 26, 1962     2 Sheets-Sheet 1

INVENTOR.
LYNN BRADT
BY
ATTORNEY

Sept. 29, 1964 L. BRADT 3,150,609
TRAIN AND AUTOMATIC SEPARATION MEANS FOR VEHICLES THEREOF
Filed June 26, 1962 2 Sheets-Sheet 2
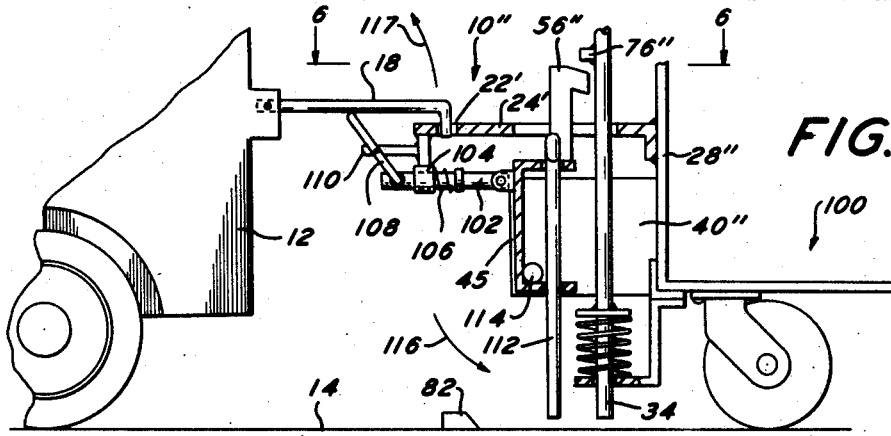
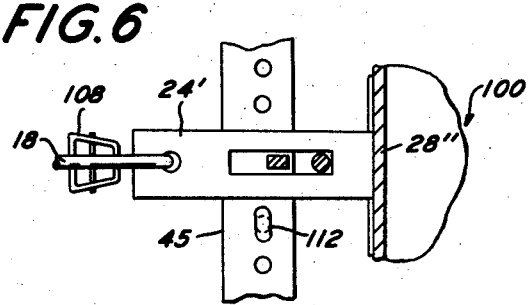
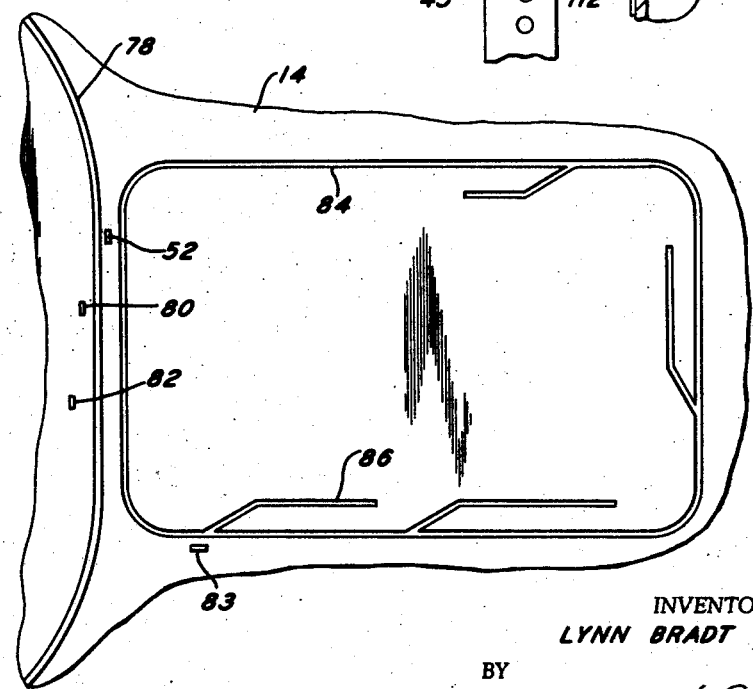
INVENTOR.
LYNN BRADT
BY
Arthur H. Seidel
ATTORNEY United States Patent Office 3,150,609
Patented Sept. 29, 1964

3,150,609
TRAIN AND AUTOMATIC SEPARATION MEANS FOR VEHICLES THEREOF
Lynn Bradt, Easton, Pa., assignor to SI Handling Systems, Inc., Easton, Pa., a corporation of Pennsylvania
Filed June 26, 1962, Ser. No. 205,304
16 Claims. (Cl. 104—172)

This invention relates to a train and automatic means for disconnecting vehicles thereof.

The apparatus of the present invention includes a towing vehicle and a towed vehicle. The vehicles may be driverless since the present invention will facilitate discoupling of vehicles of the train automatically. A connecting means is provided between the vehicles so that the towing vehicle may tow the towed vehicle therebehind. Selectively variable means are provided on the towed vehicle for disconnecting the connecting means in response to contact with an abutment. For purposes of illustration, the abutment may be on a floor on which the vehicles are in rolling contact.

The towing vehicle may be a driverless tractor which is caused to be propelled along a fixed guide means such as a guide channel in the floor, an electric wire having current of a specific frequency propagated therealong with the wire supported by the floor, etc. The towed vehicles are each preferably provided with a reciprocally supported upright disposed tow pin having an inoperative position when its vehicle is being towed. Each tow pin has an operative position wherein it is adapted to extend into a guide channel in the floor for contact with a dog on a chain or similar conveyor means.

The guide means for the towing vehicle preferably extends to a point adjacent the guide means for the towed vehicle. In accordance with the present invention, the towing vehicle will automatically separate from the towed vehicle at a designated point so that the towed vehicle may be manually or otherwise moved to a disposition wherein the tow pin will be disposed within the guide channel. Prior to movement of the towed vehicles to a disposition so that the tow pin thereof will extend into the guide channel for contact with the dogs, trip rods may be selectively positioned so that the towed vehicle will be dispatched to any one of a variety of spurs at which point loading or unloading may take place.

It is an object of the present invention to provide a novel train and automatic separating means for vehicles thereof.

It is another object of the present invention to provide a novel means for disconnecting separate vehicles of a train at a desired location.

It is another object of the present invention to provide a novel means for automatically disconnecting a coupling means between two vehicles in response to contact with an abutment.

It is another object of the present invention to provide a novel automatic means for disconnecting each vehicle of a train of vehicles with respect to each other.

It is still another object of the present invention to provide a novel disconnecting means which is simple, inexpensive and reliable.

Other objects will appear hereinafter.

For the purpose of illustrating the invention there is shown in the drawings forms which are presently preferred; it being understood, however, that this invention is not limited to the precise arrangements and instrumentalities shown.

FIGURE 5 is a partial elevation view of a towing vehicle and a towed vehicle together with the connecting means extending therebetween in accordance with another embodiment of the present invention.

FIGURE 6 is a view taken along the lines 6—6 in FIGURE 5.

FIGURE 7 is a partial plan view of a guide track for a towing vehicle and a track for towed vehicles.

Referring to the drawing in detail, wherein like numerals indicate like elements, there is shown in FIGURE 1 a train designated generally as 10.

Figure 1:
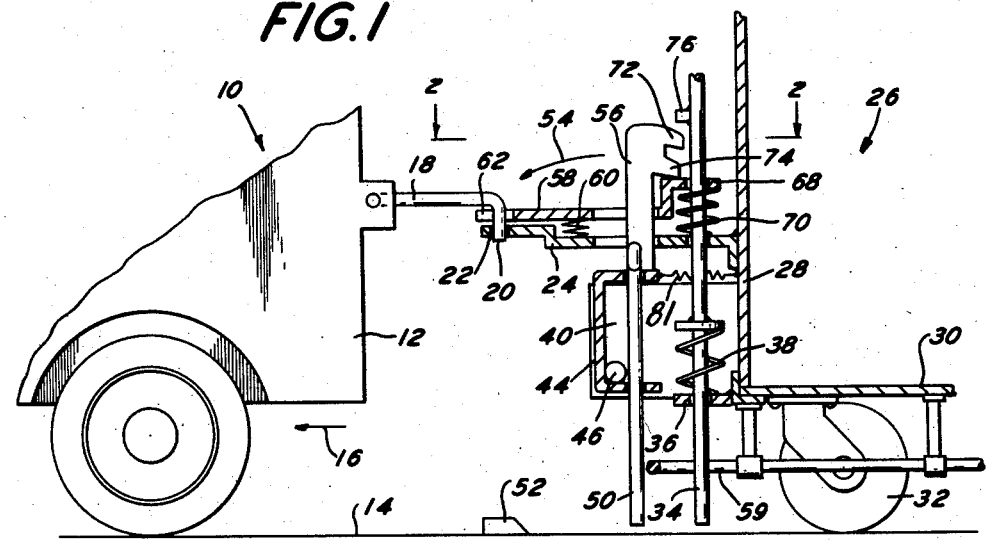
FIG. 1 is a partial elevation view of a towing vehicle and a towed vehicle together with the connecting means extending therebetween.

The train 10 includes a towing vehicle or tractor 12 and a plurality of towed vehicles 26. In FIGURE 1, only a portion of one of the vehicles 26 is illustrated. The towing vehicle 12 is provided with wheels in rolling contact with a supporting surface such as floor 14 and is intended to be moving in the direction of arrow 16. A connecting arm 18 has one end pivotably secured to a rear of the towing vehicle 12. The other end of the arm 18 terminates in a hook portion 20.

The hook portion 20 extends through a hole 22 in a support plate 24 on vehicle 26 when vehicle 26 is being towed by vehicle 12. Plate 24 is fixedly secured to and extends forwardly of the front plate 28 of the vehicle 26. The vehicle 26 includes a platform 30 supported by wheels 32 which in turn are in rolling engagement with the supporting surface or floor 14.

The vehicle 26 is provided with a reciprocally disposed upright tow pin 34. The tow pin 34 extends through a guide hole in a bracket 36 and is biased to an inoperative position as illustrated in FIGURE 1 by spring 38.

Figures 2, 4:
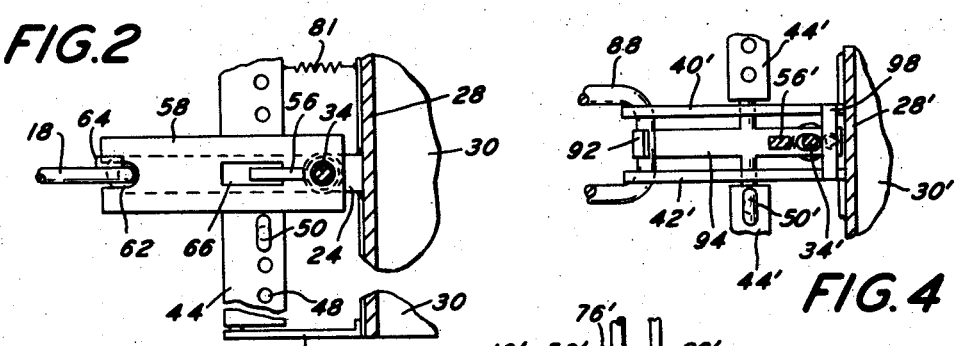
FIGURE 2 is a view taken along the lines 2—2 in FIGURE 1.
FIGURE 4 is a view taken along the lines 4—4 in FIGURE 3.

As shown more clearly by a comparison of FIGURES 1 and 2, a pair of spaced parallel support plates 40 and 42 extend forwardly from and are secured to the front plate 28. A C-shaped pivotable trip rod support 44 extends between the plates 40 and 42. A shaft 46 is secured to the support 44. The ends of the shaft 46 are rotatably supported by the plates 40 and 42.

A plurality of spaced aligned holes 48 are provided in the horizontally disposed portions of the C-shaped support 44. A trip rod 50 terminating at its upper end in a handle portion extends through a pair of the aligned holes 48. The lowermost end of the trip rod 50 is spaced from the supporting surface or floor 14 and is adapted to contact an abutment 52 on the supporting surface or floor 14 as a result of its position along the C-shaped support 44.

A hook member 56 is secured to the upper surface of the C-shaped support 44 and extends through a hole in the plate 24. A step plate 58 overlies the plate 24 and is spring biased upwardly in FIGURE 1 by means of spring 60. As shown more clearly in FIGURE 2, the end of the plate 58 adjacent the free end of the plate 24 is provided with a U-shaped notch 62 thereby causing the plate 58 to terminate in a pair of prongs. One of the prongs is disposed below a tab 64 on the connector arm 18. The hook portion 20 also extends through the notch 62.

The plate 58 is provided with a hole 66 through which the hook member 56 extends. The plate 58 terminates in a lip 68 having a hole therethrough. The tow pin 34 extends through the last mentioned hole. A spring 70 surrounds the tow pin and biases the lip 68 upwardly in FIGURE 1.

The hook member 56 is provided with a pair of hook projections 72 and 74. The projection 74 overlies a portion of the lip 68 thereby opposing pressure exerted on the lip 68 by spring 70. As a result of the contact between lip 68 and projection 74 and the contact between one of the prongs on plate 58 and the tab 64, each of the springs 60 and 70 are in a compressed state.

The tow pin 34 is provided with a lug 76 adapted to be caught by the hook projection 72. When the lug 76 is caught below the hook projection 72, spring 38 will be compressed and the lowermost end of the tow pin 34 will extend into a guide channel for contact with a dog on a conveyor means.

If desired, the vehicle 12 may be driverless. Hence, the vehicle 12 may be caused to follow a guide means 78, see FIGURE 7. Guide means 78 may be a guide channel in the floor 14, a wire on the floor 14 having a signal of a predetermined frequency propagated therealong, etc. If the guide means 78 is a wire having a predetermined frequency propagated therealong, a detecting device responsive to said frequency will be provided on the vehicle 12.

As shown more clearly in FIGURE 7, the guide means 78 has a portion passing alongside of a guide means 84. Abutments 52, 80 and 82 are provided in the area of the contiguous portions of the guide means 78 and 84. The guide means 84 may be a channel in the floor with a chain or conveyor means therebelow. The guide means 84 may have a plurality of spurs 86 as illustrated in FIGURE 7.

The operation of the present invention is as follows:

A driverless train 10 may be dispatched along guide means 78. The trip rods 50 on the vehicle 26 will be preset in one of the holes 48 so that a disconnecting of the vehicles will be automatically accomplished at a point adjacent one of the abutments 52, 80 or 82.

Assuming the trip rod 50 has been positioned so that it will contact the abutment 52, such contact will cause the C-shaped support 44 to rotate in a direction of arrow 54 about the longitudinal axis of the shaft 46. Since the hook member 56 is integral with the C-shaped support 44, the hook member 56 also rotates in the direction of the arrow 54. In doing so, the hook projection 74 clears the lip 68 thereby enabling the springs 60 and 70 to expand. Expansion of the springs 60 and 70 raises the plate 58.

As the plate 58 is raised in FIGURE 1, contact between one of the prongs on plate 58 and the tab 64 causes the hook portion 20 to be raised upwardly out of the hole 22 as the connector arm 18 pivots about the lefthand end thereof in FIGURE 1. When the hook portion 20 has cleared the hole 22, the vehicles 12 and 26 separate. If desired, suitable means such as a spring biased U-shaped member 59 (not shown) may be provided so that rotation of the C-shaped support 44 also applies brakes to the vehicle 26. When the train 10 is moving slowly, little momentum will be built up, and hence the vehicle 26 will readily come to a stop. If desired, a spring 81 may be provided to automatically cause the C-shaped support 44 to assume the position illustrated in FIGURE 1 after it has been rotated in response to contact between the trip rod 50 and abutment 52.

The height of the step plate 58 from the floor 14 is low enough so that the step plate may be recocked thereby compressing the springs 60 and 70 merely by stepping on the plate 58 and applying pressure in a direction toward the floor 14. In doing so, the hook member 56 will rotate clockwise until the lip 68 is below and held by the projection 74. Up to this point, the tow pin 34 has been biased to its inoperative position illustrated in FIGURE 1 by the spring 38. As shown more clearly in FIGURE 7, the abutment 52 is adjacent the guide means 84. The guide means 84 may be a channel in the floor 14. A conveyor means such as a chain having a dog thereon may be disposed below this channel. The vehicle 26 may then be manually pushed to a disposition where it straddles the guide means 84. Thereafter, the tow pin 34 will be moved to its operative disposition by applying downward pressure on the tow pin 34 thereby compressing the spring 38. The tow pin 34 is maintained in its operative disposition by interengagement of projection 72 and lug 76.

The lowermost end of the tow pin 34 is adapted to extend into the channel. The next dog on the conveyor means will abuttingly contact the lowermost end of the tow pin 34 thereby propelling the vehicle 26 along the guide means 84. By pre-selecting the disposition of the trip rod 50, the vehicle 26 may be caused to automatically enter one of the spurs 86 as described below. This may be accomplished, for example, by adjusting the trip rod 50 along member 44 so that it contacts abutment 83.

When trip rod 50 contacts abutment 83, the hook member 56 will rotate in the direction of arrow 54. Thereafter, the lug 76 will be clear of the projection 72 thereby enabling the spring 38 to expand and raise the lowermost end of the tow pin 34 so as to be out of contact with the dog on the conveyor means but still in guide means 84. By providing and suitably setting a suitable switching element, not shown, the tow pin will then enter the pre-selected spur 86. Such means do not comprise part of the present invention, but are fully disclosed in Patent No. 3,103,183, assigned to the assignee of the instant invention.

Figure 3:
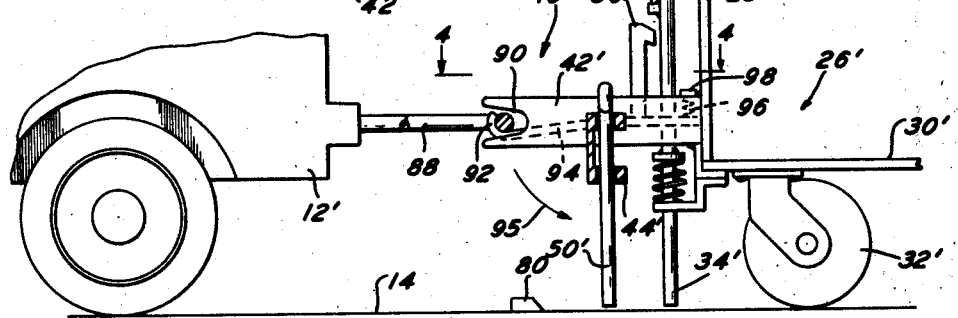
FIGURE 3 is a partial elevation view of a towing vehicle and a towed vehicle together with the connecting means extending therebetween in accordance with another embodiment of the present invention.

In FIGURE 3, there is illustrated another embodiment of the present invention wherein the train is designated generally as 10'. The train 10' is identical with the train 10 except as will be made clear hereinafter. Corresponding structure in the trains 10 and 10' are provided with corresponding primed numerals.

The connector arm on the towing vehicle 12' is in the form of a bail 88 having its free end pivotably connected to a rear portion of the vehicle 12'. As shown more clearly by a comparison of FIGURES 3 and 4, the support plates 40' and 42' extend forwardly from a central portion of the front plate 28' on the vehicle 26'. The C-shaped support 44' extends to either side of the plates 40' and 42' and has a central portion thereof rotatably supported by the plates 40' and 42'.

The free ends of the plates 40' and 42' are provided with a U-shaped notch 90 as illustrated more clearly in FIGURE 3. The arcuate portion of the bail 88 is disposed within the notches 90 and is held therein by a hook 92 on a hook member 94. The hook member 94 is integral with the central portion of the C-shaped support 44' between the plates 40' and 42'.

A hook member 56' having a single projection is integral with the hook member 94. The single projection on the hook member 56' is adapted to cooperate with the lug 76' on the tow pin 34'. A cross plate 98 extends between the top edges of the plates 40' and 42' adjacent the front plate 28'. A spring 96 has one end in abutting contact with the cross plate 98 and biases the hook member 94 to the position illustrated in FIGURE 3.

Assuming that the trip rod 50' is positioned along the C-shaped support 44' so that it will abuttingly contact abutment 80, such contact will cause the C-shaped support 44' and hook member 94 to rotate in the direction of arrow 95 in FIGURE 3. Such rotation enables the hook 92 to clear the arcuate portion of the bail 88. Thereafter, the arcuate portion of the bail 88 slides along the downwardly tapered surfaces defining the notches 90.

In the meantime, rotation of the hook member 94 compresses the spring 96. As soon as the trip rod 50' has cleared the abutment 80, the spring 96 will expand thereby pivoting the hook member 94 and C-shaped support 44' to the position illustrated in FIGURE 3. Prior to resumption of said last mentioned position of the hook member 94, the bail 88 will have cleared the notches 90 thereby disconnecting the vehicles 12' and 26'. In all other respects, the operation and structure of the train 10' may be identical with that of train 10.

In FIGURES 5 and 6, there is disclosed another embodiment of the present invention wherein the train is designated generally at 10". The train 10" is identical with train 10 except as will be made clear hereinafter. In train 10", the vehicle 100 is adapted to be towed by the vehicle 12 as a result of the hook portion on the connector arm 18 extending through a hole 22' in the support plate 24'.

The vehicle 100 is provided with a C-shaped support 45 which is rotatably supported from support plates in the identical manner as that illustrated in FIGURE 1. A hook member 56" is integral with the C-shaped support 45. Member 56" is provided with a single projection adapted to cooperate with lug 76" on the tow pin 34. One end of a rod member 102 is pivotably connected to the C-shaped support 45 adjacent a top edge thereof. The rod member 102 extends through a guide sleeve 104.

The sleeve 104 is supported in depending relationship from the plate 24'. A spring 106 surrounds the rod member 102. One end of the spring 106 abuts the sleeve 104. The other end of the spring 106 is in abutting contact with an adjustable collar on the member 102.

The end of the rod member 102 remote from the support 45 is pivotably secured to one end of a lever 108. The lever 108 is rotatably supported at a point intermediate its ends by a pin on a forwardly extending bracket arm 110 which is supported from the plate 24'. The lever 108 is in the form of a closed loop as illustrated more clearly in FIGURE 6 thereby assuring that a substantial portion thereof will be in contact with a lowermost surface on the connector arm 18.

It will be assumed that the trip rod 112 is positioned along the C-shaped support 45 in a position so that it may contact abutment 82. When trip rod 112 contacts abutment 82, the support 45 rotates about shaft 114 in the direction of arrow 116 in FIGURE 5. Such rotation causes the rod member 102 to move to the left in FIGURE 5 thereby compressing the spring 106 and causing the lever 108 to rotate in a clockwise direction. Such rotation of the lever 108 causes the connector arm 18 to rotate in the direction of arrow 117 thereby enabling the hook portion thereof to clear the hole 22'. Thereafter, the spring 106 will expand so as to bias the support 45 to the disposition illustrated in FIGURE 5. Otherwise, the train 10" is identical with the train 10'.

In each embodiment of the present invention, a connecting means is provided in a manner so that a towing vehicle will automatically be disconnected with respect to a vehicle towed thereby in response to contact between a trip rod on the towed vehicle and an abutment. As illustrated, the abutments 52, 80 and 82 are fixed abutments. If, the abutments may be reciprocally or rotatably supported by the supporting surface or floor 14. Hence, the abutments need not be fixed with respect to the floor but should be at a predetermined position on the floor or supporting surface. Since the automatic disconnecting of a vehicle of a train is accomplished as a result of a predetermined relationship between abutments and trip rods on the towed vehicle or vehicles, the towing vehicle may have a driver or may be driverless.

The towing vehicles 12 and 12' may or may not be self-propelled depending upon the particular guide means 78. The towed vehicles are preferably driverless. When causing a decoupling of the vehicles of a train, the trip rods on each of the towed vehicles should be preset so that the last vehicle of the train is decoupled first, then the next to last vehicle, etc. It will be obvious to those skilled in the art that the present invention is not limited to the number of towed vehicles of a train. Hence, the present invention may be utilized with a train having one or more towed vehicles with the coupling between any two adjacent vehicles being as per the species disclosed in FIGURES 1 and 2 or FIGURES 3 and 4 or FIGURES 5 and 6. Also, it will be clear that the towed vehicles of the present invention may be of the type having accumulation bumpers thereon structurally interrelated with means for applying brakes to the vehicles.

Hereinafter, the vehicles 12 and 12' may be referred to as towing vehicles. Hereinafter, the vehicles 26, 26' and 100 may be referred to as towed vehicles.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a towing vehicle, a towed vehicle, first means connecting said vehicles so that said towing vehicle may tow said towed vehicle, and second means on said towed vehicle for disconnecting said first means in response to contact by said second means with an abutment positioned at a location wherein it is desired that the vehicles be disconnected.

2. Apparatus in accordance with claim 1 including a guide means for said towing vehicle, said abutment being disposed at a point adjacent said guide means.

3. Apparatus in accordance with claim 1 wherein said towed vehicle has a reciprocally supported upright tow pin, said tow pin being adapted to cooperate with a conveying means capable of propelling said towed vehicle along a predetermined path after said towed vehicle has been disconnected from said towing vehicle.

4. Apparatus in accordance with claim 1 wherein said second means on said towed vehicle includes a support mounted for rotation about a horizontal axis extending transversely across said towed vehicle, and an abutment engaging member of said second means mounted on said support whereby said abutment engaging member may contact said abutment.

5. Apparatus in accordance with claim 1 including a floor on which said vehicles are supported, the abutment being supported by said floor, and said second means on said towed vehicle including a selective positionable member having one position wherein it is adapted to contact said abutment.

6. Apparatus in accordance with claim 1 wherein said first means includes a hook on said towing vehicle and cooperating structure on said towed vehicle for receiving said hook.

7. Apparatus in accordance with claim 6 including a step plate on said towed vehicle, resilient means biasing said step plate in a direction so that said step plate may release said hook with respect to said cooperating structure, and said means on said towed vehicle opposing said bias on said step plate.

8. Apparatus in accordance with claim 1 wherein said first means includes a bail, said bail being pivotably connected at one end to said towing vehicle.

9. Apparatus in accordance with claim 1 wherein said first means includes a connector arm terminating in a hook portion, the end of said connector arm remote from said hook portion being pivotably connected to said towing vehicle, and means supported by said towed vehicle for camming said connector arm upwardly in response to actuation of said means on said towed vehicle.

10. Apparatus comprising a vehicle, said vehicle having an upright reciprocally supported tow pin, said tow pin having an operative position wherein it is adapted to have end in contact with a dog on a conveyor means, coupling means on said vehicle for connecting said vehicle to a second vehicle so that said second vehicle may tow said first mentioned vehicle, said tow pin being in an inoperative position during said towing operation, and means on said first mentioned vehicle for disconnecting said coupling means in response to contact by said disconnecting means with an abutment positioned at a location wherein it is desired that the vehicle is to be disconnected.

11. A vehicle comprising a body mounted on wheels, a pair of support plates mounted on said body, a trip rod, said trip rod being attached to a support rotatably supported by said plates for rotation about a substantially horizontal axis, spring means biasing said trip rod support to a first position, a support plate on said body, a step plate disposed over said support plate, spring means biasing said step plate upwardly in a direction away from said support plate, and a hook member integral with said trip rod support, said hook member opposing the spring bias on said step plate when said trip rod support is in said first mentioned position, said trip rod being adapted to rotate said trip rod support to a second position by contact with an abutment wherein said hook member is released from opposing the bias of the step plate, whereby said step plate can move upwardly away from said support plate.

12. A vehicle comprising a body having wheels, first and second support plates on said body, a trip rod, said trip rod being attached to a support rotatably supported by said first and second plates for rotation about a substantially horizontal axis, said first and second plates having notches on their free ends for receiving a bail, a hook member integral with said trip rod support, said hook member terminating in a hook disposed between the notches on said first and second plates for grasping said bail, said trip rod being adapted to rotate said trip rod support to a position by contact with an abutment wherein said hook is released from grasping engagement with said bail.

13. A towed vehicle comprising a body having wheels, a trip rod, said trip rod being attached to a support, means for supporting the trip rod support on said vehicle for rotation about a substantially horizontal axis, a support plate mounted on said body and extending forwardly thereof, said support plate being above the axis of rotation of said trip rod support, said plate having a means for cooperating with a connector arm of a towing vehicle, said trip rod being adapted to rotate said trip rod support upon contact of said trip rod with an abutment, and a pivotably mounted lever structurally interrelated with said trip rod support in a manner so that said lever may disconnect a connector arm with respect to said plate in response to rotation of said trip rod support by said trip rod.

14. A vehicle in accordance with claim 11 including means for selectively positioning said trip rod at spaced points along the length of said trip rod support.

15. A vehicle in accordance with claim 12 including means for selectively positioning said trip rod at spaced points along the length of said trip rod support.

16. A vehicle in accordance with claim 13 including means for selectively positioning said trip rod at spaced points along the length of said trip rod support.

References Cited in the file of this patent
UNITED STATES PATENTS

| | | |
|---|---|---|
| 2,619,370 | Leger | Nov. 25, 1952 |
| 2,871,799 | King | Feb. 3, 1959 |
| 3,078,810 | Bradt et al. | Feb. 26, 1963 |
| 3,094,944 | Bradt et al. | June 25, 1963 |
| 3,103,183 | Bradt et al. | Sept. 10, 1963 |
| 3,103,895 | Bradt et al. | Sept. 17, 1963 |